May 26, 1953     L. D. ROOKSTOOL     2,639,498
BEARING INSERT REMOVING AND APPLYING TOOL
Filed Oct. 22, 1948
FIG. 1.
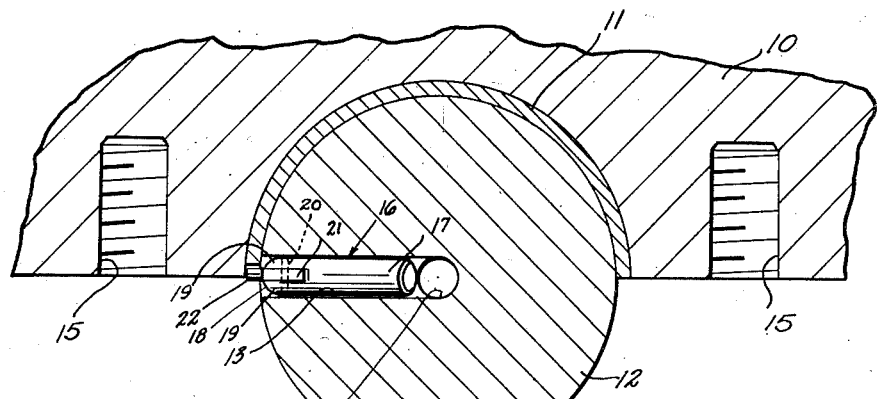
FIG. 2.
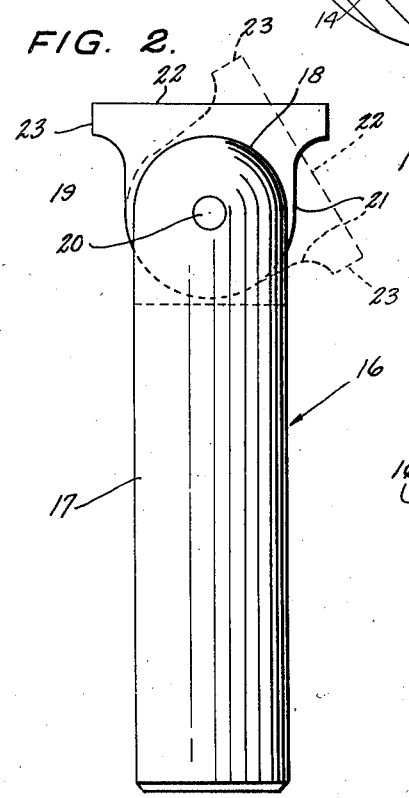
FIG. 3.
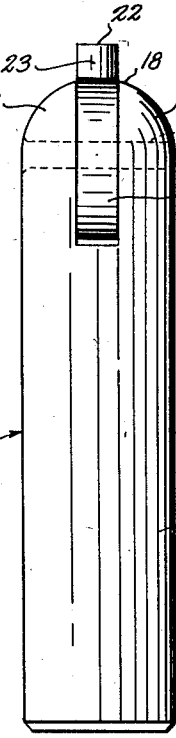
FIG. 5.
FIG. 4.
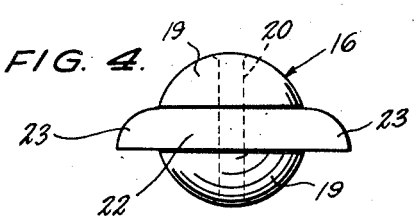
INVENTOR.
LESTER D. ROOKSTOOL,
BY
McMorrow, Berman & Davidson
ATTORNEYS.

Patented May 26, 1953

2,639,498

UNITED STATES PATENT OFFICE 2,639,498

BEARING INSERT REMOVING AND APPLYING TOOL

Lester D. Rookstool, Glenrock, Wyo.

Application October 22, 1948, Serial No. 56,007

2 Claims. (Cl. 29—270)

My invention relates to tools for removing and/or applying the bearing insert for the bearings of a shaft. More particularly, the tool of the invention is applicable to removing and inserting the connecting rod and/or main bearing inserts for crankshafts of internal combustion engines.

Such crankshafts usually have formed therein an oil hole for lubricating the bearings, there being usually an oil hole opening outwardly of the crankshaft in the region of each bearing, whereby to lubricate the same as the shaft is rotated. Such oil holes usually extend outwardly at angles to the axis of the shaft, and such angle is seldom normal to the axis of the shaft. Moreover, such angle will vary with different makes of engines, whereby a mechanic has considerable difficulty in maintaining insert-removing tools seatable in the oil holes for removing the bearing inserts by manual rotation of the crankshaft. In the present practice, the mechanic must maintain a different tool for each make of engine, or for each engine, wherein the oil holes of the crankshaft open outwardly at different angles.

With the foregoing in view, it is an object of my invention to provide an improved bearing insert-removing tool of the class described which is adaptable to all makes of engines irrespective of the angles at which the oil holes extend from the axis of the shaft.

A further object is to provide an insert-removing tool comprising a shank insertable in the oil hole of a shaft, and a head adjustably connected to the shank so as to be self-aligning with the axis of the shaft, whereby to extend parallel thereto irrespective of the angle of the oil hole.

Other objects and advantages reside in the particular structure of the invention, combination and arrangement of the several parts thereof, and will be readily understood by those skilled in the art upon reference to the attached drawing in connection with the following specification, wherein the invention is shown, described and claimed.

In the drawing:

Figure 1 is a vertical cross-sectional view through a crankshaft and bearing insert showing the tool of the invention in elevation;

Figure 2 is an elevational view of the tool according to the invention apart from the crankshaft;

Figure 3 is a view like Figure 2, but taken at an angle of 90° relative to Figure 2;

Figure 4 is a plan view of the tool of Figure 2;

Figure 5 is a perspective view of the tool head apart from the rest of the tool structure.

Referring specifically to the drawing, wherein like reference characters have been used throughout the several views to designate like parts, and referring at first to Figure 1, 10 designates any suitable support for a bearing insert 11 for a crankshaft or other shaft 12. The shaft 12 is provided with an outwardly-directed oil hole 13 which may open into an axially-disposed oil passage 14 in a well known manner. In the embodiment illustrated, the support 10 may comprise an engine block, but it is understood that it may also comprise a connecting rod or other support for the bearing insert 11. A bearing cap usually encircles the other half of the crankshaft 12, but has been omitted for the purposes of clarity. Such bearing cap is secured to the support 10 by any suitable bolts or studs, not shown, which are insertable in the holes 15 to clamp the cap in place. As so far described, the structure may be conventional and forms no part of the present invention.

As mentioned previously, the oil holes 13 seldom extend outwardly at the same angle in different makes of shafts or engines. Thus, when a mechanic wishes to remove an insert 11 by inserting a tool in the oil hole 13, said tool including a head engageable with the edge of the insert to remove or insert the same upon rotation of the shaft 12 in opposite directions, it is necessary for the mechanic to have a separate tool for each shaft or engine wherein the oil holes extend at different angles. To overcome this difficulty, there has been provided according to the invention a tool generally indicated at 16 which comprises a shank 17 insertable in the oil hole 13. The shank 17 has a rounded outer end 18 formed to provide a pair of spaced ears 19 mounting a pivot pin 20 therebetween. The pivot pin 20 has pivotally mounted thereon in any suitable manner a flat head 21 which includes a straight free outer edge 22 providing a lip adapted to project outwardly of the oil hole 13 for engagement with an edge of the bearing insert 11 to remove or apply the same upon rotation of the crankshaft 12 in opposite directions. As is readily apparent from the foregoing, by pivoting the lip 22 and head 21 to the shank 17, the lip 22 may be readily adjusted so as to flatly engage a bearing insert 11 irrespective of the angle of the oil hole 13.

To limit the insertion of the shank 17 into the oil hole 13 and also to make the tool self-aligning, the lip 22 has been provided with a pair of laterally oppositely-directed extensions 23 which extend outwardly of the shank 17 and oil hole 13 in opposite directions so as to engage the periphery of the shaft 12 on opposite sides of the oil hole and automatically cause the head 21 to be pivoted to a position disposing the lip 22 in parallelism to the axis of the shaft 12. Thus, it is only necessary for a mechanic to insert the shank 17 into an oil hole whereby the lip is automatically aligned in parallel relation to the axis of the shaft 12 by the combined engagement of the extensions 23 with the periphery of the shaft and by the engagement of the lip 22 with the adjacent edge of the insert 11. Thereafter, by manually rotating the shaft 12 in a well known manner, the insert 11 is either removed or inserted in its seat as the case may be.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. In a tool for use in removing and replacing semicylindrical bearing inserts surrounding shafts having generally radially oil holes disposed at different angles to the axes of the shafts and the bearing inserts, a shank adapter adapted to be inserted in a shaft oil hole, said shank having an inner end adapted to enter the oil hole and an outer end portion, said outer end portion terminating in an outer end, said outer end being formed with a transverse slot opening through opposite sides of the shank and extending through said outer end, a pivot pin on said outer end portion and extending across the slot, and a self-aligning head comprising a flat plate having an inner end portion positioned within said slot and pivotally mounted on said pivot pin and an outer end portion projecting outwardly beyond the outer end of the shank for engagement with one end of a semicylindrical bearing insert.

2. In a tool for use in removing and replacing semicylindrical bearing inserts surrounding shafts having generally radial oil holes disposed at different angles to the axes of the shafts and the bearing inserts, a shank adapter adapted to be inserted in a shaft oil hole, said shank having an inner end adapted to enter the oil hole and an outer end portion, said outer end portion terminating in an outer end, said outer end being formed with a transverse slot opening through opposite sides of the shank and extending through said outer end, a pivot pin on said outer end portion and extending across the slot, and a self-aligning head comprising a flat plate having an inner end portion positioned within said slot and pivotally mounted on said pivot pin and an outer end portion projecting outwardly beyond the outer end of the shank for engagement with one end of a semicylindrical bearing insert, said outer end portion of said plate having lateral extensions at opposite sides thereof, said extensions projecting beyond opposite sides of said shank and being engageable with the surface of the shaft at either side of the oil hole as the shank is inserted in the oil hole whereby said head is angularly adjusted relative to said shank into position to effectively engage with an end of the bearing insert.

LESTER D. ROOKSTOOL.

References Cited in the file of this patent

UNITED STATES PATENTS

| Number | Name | Date |
|---|---|---|
| 236,738 | Wales | Jan. 18, 1881 |
| 631,113 | Geiser | Apr. 15, 1899 |
| 687,809 | Wrigley | Dec. 3, 1901 |
| 1,451,212 | Fye | Apr. 10, 1923 |
| 1,808,625 | Barnhardt | June 2, 1931 |
| 1,872,600 | Manning | Aug. 16, 1932 |
| 2,124,658 | Smith | July 26, 1938 |
| 2,485,531 | Dzus et al. | Oct. 18, 1949 |

FOREIGN PATENTS

| Number | Country | Date |
|---|---|---|
| 18,341 | Great Britain | Aug. 3, 1910 |